Aug. 10, 1937.  B. I. KASSING  2,089,381

MOTOR DRIVE

Filed Aug. 17, 1935

INVENTOR.
BURTON I. KASSING.
BY
ATTORNEY

Patented Aug. 10, 1937

2,089,381

UNITED STATES PATENT OFFICE 2,089,381

MOTOR DRIVE

Burton I. Kassing, Utica, N. Y., assignor to Remington Arms Company, Inc., a corporation of Delaware Application August 17, 1935, Serial No. 36,640

4 Claims. (Cl. 248—23)

This invention relates to variable speed drive mechanism, and contemplates mechanism for mounting an ordinary constant speed electric motor upon the frame of a machine to be driven thereby in such a way as to provide for driving the machine at differing speeds.

More specifically, the invention contemplates driving devices for a machine equipped with a stepped or "cone" pulley from a motor provided with a single pulley, and so shifting the motor longitudinally of the machine as to align its pulley with different steps of the cone, and simultaneously shifting the motor transversely to enable the use of the same driving belt between the motor pulley and different steps of the cone.

Figure 2:
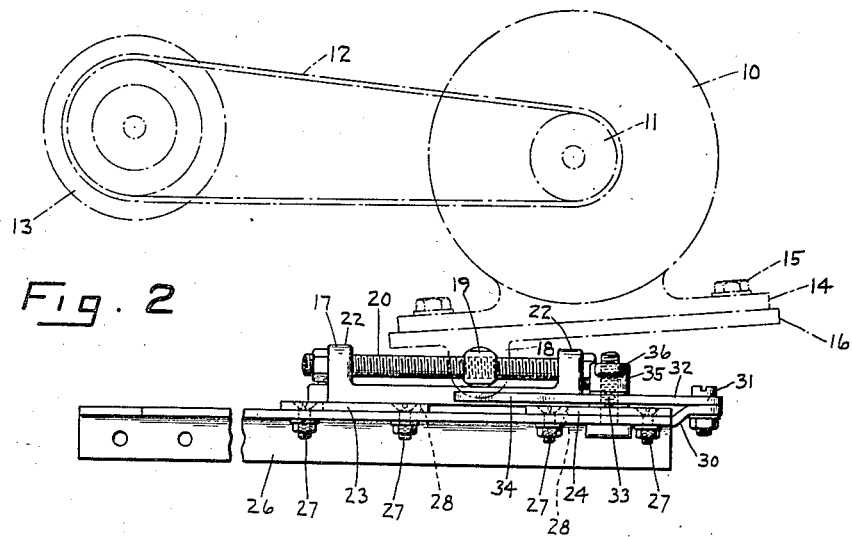
Fig. 2 is an end elevation of the drive mechanism, the motor and the cone pulley driven thereby being indicated in broken lines.

The motor 10 comprises the usual single pulley 11 driving a belt 12 which passes over one of the steps of a cone pulley 13. The motor is provided with the usual base 14. To the base 14 is secured, by suitable means such as bolts 15, a frame or sub-base 16 which is suitably supported on a shifting frame identified generally by the numeral 17. Means for this purpose may comprise downwardly extending ears 18 on the sub-base 16, which ears are apertured to receive a rod 19, the ends of which are drilled and tapped to receive threaded screws 20 and 21 supported in ears 22 upstanding from the shifting frame 17. By moving the rod 19 along the screws 20 and 21, the tension on the belt 12 may be adjusted. As shown in Fig. 2, the center of gravity of the motor is on the opposite side of the rod 19 from the cone pulley 13; thus, the tendency of the motor to rotate about the rod 19 places added tension upon the belt 12. The motor supporting devices above-outlined are substantially similar to those disclosed in the patent to Hamerstadt, No. 1,935,878, November 21, 1933, and are not per se a part of the present invention.

Figure 1:
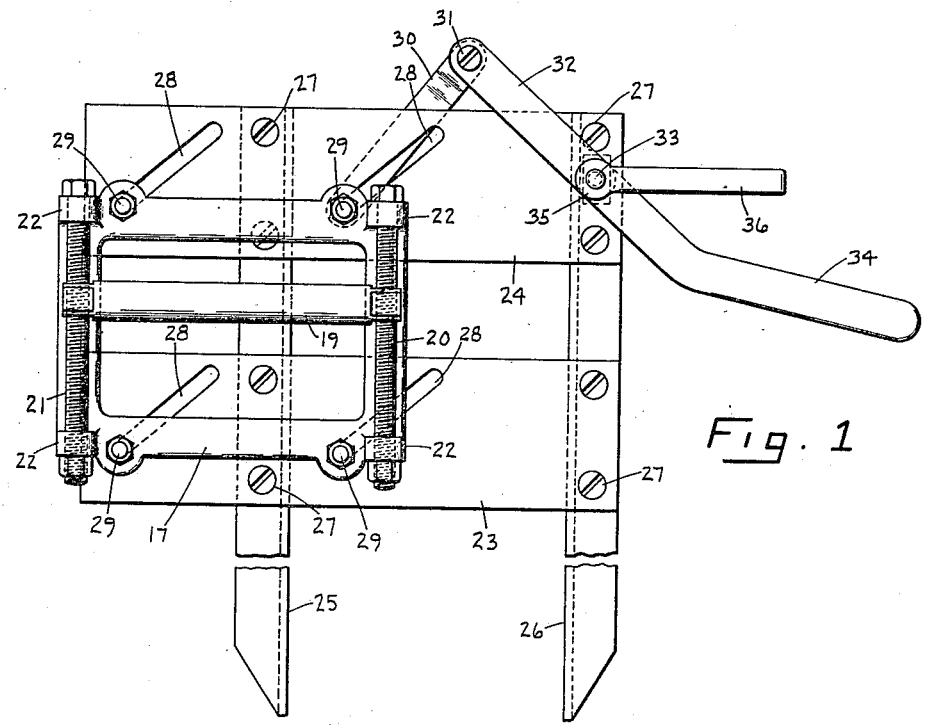
Fig. 1 is a plan view of the motor supporting and shifting mechanism, the motor itself being omitted.

The frame 17 is movably mounted upon a stationary frame secured to the bed of the machine, which bed also supports the cone pulley 13. As shown in the drawing, said stationary frame comprises longitudinal plates 23 and 24 secured to transversely extending angle bars 25 and 26 by suitable means such as bolts 27. The plates 23 and 24 comprise diagonally extending slots 28, which slots receive bolts 29 depending from the shifting frame 17. Movement of bolts 29, and with them the motor, in slots 28 from the position shown in Fig. 1 carries the motor forward and to the right in said figure; thus, increasing the distance between motor pulley 11 and the cone pulley 13 as the pulley 11 is aligned with different steps of the cone pulley 13 by an amount sufficient to maintain the same belt length between the driving and driven elements.

Suitable means are provided for shifting the frame 17, one form of which may be constructed as follows:

To one of the bolts 29 is pivoted a link 30 which is joined at 31 to a lever 32 pivoted at 33 in the fixed frame. The loose end of lever 32 is formed into a handle 34. By movement of the handle 34 the shifting frame and the motor can be moved to a position in which the pulley 11 is aligned with any desired step of the cone pulley 13. The shifting frame and motor are then set in the desired position by suitable devices such as a clamping nut 35 provided with an operating handle 36 and applied to the pivot 33 of the lever 32. Due to the arrangement of the motor with respect to the supporting rod 19, any tendency of the motor to creep back to a position which would slacken the belt 12 is overcome by the tendency of the weight of the motor to rock to the right (Fig. 2) about the rod 19 and thus maintain the belt under proper tension. For these reasons, friction on the pivot of the motor moving lever is sufficient to hold the motor in the desired position of adjustment.

While one particular form of the mechanism for the accomplishment of the objects of the invention has been illustrated and described in detail, it will be understood that the invention is susceptible to embodiment in many other forms, all falling within the scope of the appended claims, which are to be broadly construed.

What is claimed is:

1. In combination, a motor comprising a motor shaft, a sub-base secured to said motor, a support for said sub-base adjustably mounted in a shifting frame, a fixed frame comprising slots extending obliquely to said motor shaft, and means projecting from said shifting frame received in said slots, whereby movement of said means in said slots shifts the motor in a direction oblique to said motor shaft.

2. In combination, a motor comprising a motor shaft, a sub-base secured to said motor, a support for said sub-base adjustably mounted in a shifting frame, a fixed frame comprising slots extending obliquely to said motor shaft, means projecting from said shifting frame received in said slots, and manipulative means joined to said shifting frame for simultaneously moving said shifting frame longitudinally and transversely with respect to said fixed frame.

3. In combination, a motor comprising a motor shaft, a sub-base secured to said motor, a support for said sub-base adjustably mounted in a shifting frame, a fixed frame comprising slots extending obliquely to said motor shaft, means projecting from said shifting frame received in said slots, manipulative means joined to said shifting frame for simultaneously moving said shifting frame longitudinally and transversely with respect to said fixed frame, and means for holding said shifting frame in any desired position of adjustment upon said fixed frame.

4. In combination, a motor comprising a motor shaft, a sub-base secured to said motor, a support for said sub-base adjustably mounted in a shifting frame, a fixed frame comprising slots extending obliquely to said motor shaft, means projecting from said shifting frame received in said slots, a link joined to said fixed frame, a lever joined to said link and pivoted in said fixed frame, and means for holding said lever in a desired position of adjustment.

BURTON I. KASSING.